United States Patent [19]

Dagan et al.

[11] Patent Number: 4,859,045

[45] Date of Patent: Aug. 22, 1989

[54] VIEWFINDER SYSTEM FOR A PERISCOPE

[75] Inventors: Jacob Dagan, Gilon; Shlomo Nezer, Carmiel; both of Israel

[73] Assignee: State of Israel-Ministry of Defence, Armament Development Authority Rafael, Haifa, Israel

[21] Appl. No.: 126,124

[22] Filed: Nov. 27, 1987

[30] Foreign Application Priority Data

Dec. 2, 1986 [IL] Israel .......................................... 80830

[51] Int. Cl.$^4$ ...................... G02B 23/08; G02B 27/64; G02B 23/16; G02B 23/14

[52] U.S. Cl. .................................. 350/623; 350/540; 350/543; 350/500; 350/567

[58] Field of Search ............... 350/540, 541, 542, 543, 350/544, 500, 539, 567, 623, 618, 626

[56] References Cited

U.S. PATENT DOCUMENTS

| | | | |
|---|---|---|---|
| 2,796,815 | 6/1957 | Kaplan et al. ...................... | 350/500 |
| 3,262,364 | 7/1966 | Kollmorgen ........................ | 350/623 |
| 3,694,095 | 9/1972 | Louthan ............................... | 350/623 |
| 4,210,385 | 7/1980 | Baudot ................................. | 350/500 |
| 4,284,326 | 8/1981 | Durrer et al. ....................... | 350/543 |

FOREIGN PATENT DOCUMENTS

| | | | |
|---|---|---|---|
| 83234 | 3/1921 | Fed. Rep. of Germany ...... | 350/541 |
| 2218432 | 11/1973 | Fed. Rep. of Germany ...... | 350/500 |
| 1232099 | 5/1971 | United Kingdom ................ | 350/500 |
| 1333591 | 10/1973 | United Kingdom ................ | 350/500 |
| 1393969 | 5/1975 | United Kingdom ................ | 350/500 |

Primary Examiner—Jon W. Henry
Attorney, Agent, or Firm—Finnegan, Henderson, Farabow, Garrett & Dunner

[57] ABSTRACT

An improved viewfinder for viewing a landscape along a line of sight, the viewfinder comprising a window periscope comprising a body housing, reflective apparatus mounted on a rotation axis within an end portion of the body housing and being operable to adjust the elevation angle of the line of sight, and optical apparatus fixedly mounted in another end portion of the housing for relaying the line of sight to a viewer in relation to the adjustment; apparatus for supporting the body housing and defining a tilt axis about which the body housing can rotate in a tilting operation; and a transmission apparatus operatively associated with the supporting apparatus and the reflective apparatus for providing the elevation angle adjustment in relation to the tilting operation.

18 Claims, 3 Drawing Sheets

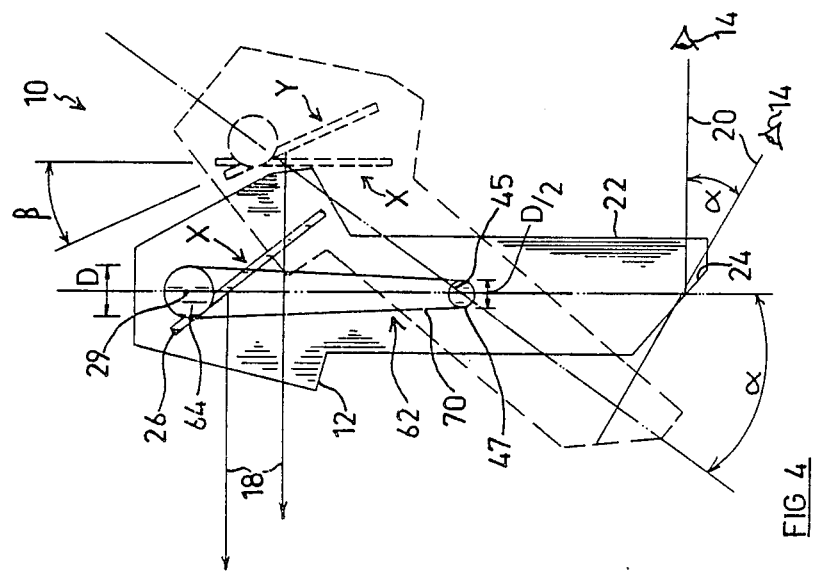
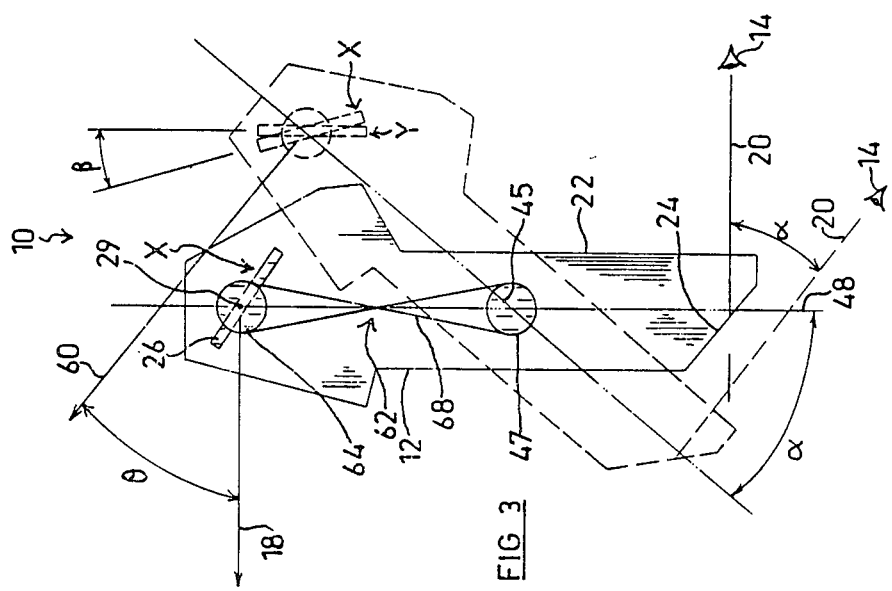

VIEWFINDER SYSTEM FOR A PERISCOPE

FIELD OF THE INVENTION

The present invention relates to viewfinder systems, more particularly, to such viewfinders as employ window periscopes for presenting a line of sight otherwise unavailable in relation to a viewer location.

BACKGROUND OF THE INVENTION

There are known window periscope systems which provide a viewer with a line of sight otherwise unavailable to him because of a protected location in which he operates. For example, in the military environment, tanks and armored personnel carriers are equipped with these systems to give the viewer as wide a field of view as possible over the landscape from within his seating compartment. Two types of window periscope systems widely used for these purposes are a movable head mirror type and a tilting body type.

The movable head mirror type of window periscope system is built with an internal movable mirror which is mounted within a fixed body housing behind a front window and relays a view of the landscape to a fixed lower mirror which the viewer observes through a window eyepiece. The viewer's eye level is therefore also fixed, and the size of the field of view depends upon the size of the head mirror. The optics are typically such that a 2:1 ratio exists relating the change in the elevation angle of the line of sight to a given angular movement of the head mirror. Approximately a 65 degree change in the elevation angle of the line of sight is achievable in these systems.

The elevation angle of the field of view in movable head mirror systems is related to the length of the head mirror by the cosine of the pitch angle of the latter. Practically, the elevation angle of the field of view is limited by the construction problems associated with providing a long enough moving head mirror. These systems are characterized by a low moment of inertia of the head mirror in making line of sight adjustments.

The other major type of window periscope is the tilting body type which has fixed head and lower mirrors mounted in a body housing which pivots on bearings around a horizontal axis. The optics provide a 1:1 ratio in the change in the elevation angle of the line of sight for a change in the angle of body tilt, but the viewer's eye must follow the lower mirror through the eyepiece as it moves with the tilting body. This places a limitation on the range of line of sight adjustments based on the limited angular motion capability of the viewer's neck, about 30-35 degrees. Also, the field of view is fixed for any degree of body tilt and the head mirror and front window are relatively small. These systems are characterized by a relatively high moment of inertia for line of sight adjustments.

SUMMARY OF THE INVENTION

It is accordingly a principal object of the invention to overcome the above-mentioned limitations and provide an improved viewfinder system offering a wider range of elevation angles of the line of sight than that available in prior art systems.

According to the invention, there is provided an improved viewfinder for viewing a landscape along a line of sight, the viewfinder comprising:

a window periscope comprising a body housing, reflective apparatus mounted on a rotation axis within an end portion of the body housing and being operable to adjust the elevation angle of the line of sight, and optical apparatus fixedly mounted in another end portion of the housing for relaying the line of sight to a viewer in relation to the adjustment;

apparatus for supporting the body housing and defining a tilt axis about which the body housing can rotate in a tilting operation; and a transmission apparatus operatively associated with the supporting apparatus and the reflective apparatus for providing the elevation angle adjustment in relation to the tilting operation.

A feature of the invention is the provision of the tiltable body housing with a tilt axis defined by an external pivot mechanism fixed to a stationary support. The pivot mechanism is operatively associated with the transmission apparatus to allow the latter to transmit rotation in relation to the degree of body tilt to a head mirror provided as the reflective apparatus, thereby adjusting the elevation angle of the line of sight.

In a preferred embodiment, the transmission apparatus is provided as a planetary transmission having an inverse transmission ratio of 1:1 between a change in the degree of body tilt and the corresponding head mirror rotation. The planetary transmission is povided by an arrangement of four arms linked so as to transfer the change in the body tilt angle to the head mirror. As a result, the elevation angle of the head mirror is adjusted by a change in the body tilt of a given angular magnitude in one direction plus an additional identical angular rotation of the head mirror in the same direction as provided by operation of the planetary transmission.

In an alternative embodiment, the planetary transmission comprises a crossed loop such as a chain, belt or band wrapped around the pivot mechanism of the body housing and a wheel or pulley mounted on the rotation axis of the head mirror. Pivoting motion caused by a change in the angle of body tilt is thus transferred to the head mirror in the same rotational sense.

In another alternative embodiment, the planetary transmission comprises a toothed wheel portion connected to the pivot mechanism and enmeshed with a similar toothed wheel portion mounted on the axis of the head mirror, providing head mirror rotation in the same sense as that of the body tilt.

In still another alternative embodiment, the planetary transmission comprises a direct loop drive using similar components between the pivot mechanism of the body housing and the head mirror rotation wheel. This arrangement provides rotation of the head mirror in an opposite sense to that of the body tilt angle and stabilizes the line of sight.

A feature of the invention is the provision of a pair of handles affixed to the body housing to allow for the viewer to change the angle of body tilt directly. In an alternative arrangement, the angle of body tilt is altered by a mechanical or electrical drive associated with the function of an operational elevation system which aims artillery equipment, radar antennas or the like.

The improved viewfinder of the present invention provides a greater field of vision than that of prior art systems and is therefore advantageous in many environments where they are inherent limitations in viewer freedom of movement.

BRIEF DESCRIPTION OF THE DRAWINGS

For a better understanding of the invention with regard to the embodiments thereof, reference is made to the accompanying drawings, in which:

FIG. 3 shows an alternative embodiment of the planetary transmission of FIG. 2 using a crossed-loop arrangement; and FIG. 4 shows another alternative embodiment of the planetary transmission of FIG. 2 using a direct drive loop arrangement for stabilizing the line of sight.

DETAILED DESCRIPTION OF A PREFERRED EMBODIMENT

Figure 1:
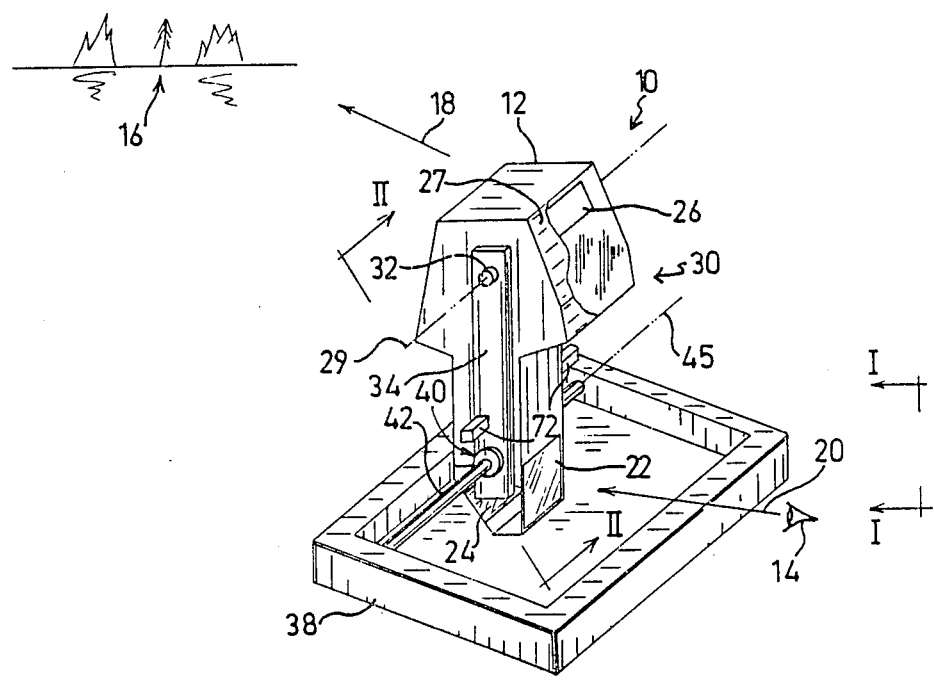
FIG. 1 shows an overall view of a preferred embodiment of the improved viewfinder in accordance with the present invention.

Referring now to FIG. 1, there is shown an overall view of a preferred embodiment of the improved viewfinder 10 of the present invention. There is provided a body housing 12 for mounting the window periscope components which enable a viewer 14 to observe a landscape scene 16 along a line of sight 18. Viewfinder 10 provides the viewer 14 with line of sight 18 which is otherwise obscured from the line of sight 20 available to him in his position, which may be a protected one such as in a military vehicle.

The viewer 14 sees the landscape 16 through lower window opening 22 in body housing 12, wherein there is situated an optical means which can be a simple reflective surface such as a mirror 24 or it can be a telescope adapted for bending light. A partial cutaway of portion 27 of body housing 12 reveals the back side of another reflecting surface such as a head mirror 26, the front side (not shown) receiving light from the landscape 16 along line of sight 18 and reflecting it to mirror 24 and viewer 14 along viewer's line of sight 20. Head mirror 26 is mounted in body housing 12 so as to be rotatable about axis 29 with respect to upper portion 30 of housing 12. In accordance with the operation of the invention as further described herein, rotation of head mirror 26 occurs about a shaft 32 shown protruding through a cover plate 34.

Body housing 12 is supported by a support frame 38 by means of a pivot mechanism 40 disposed external to cover plate 34 and visible in FIG. 1. Pivot mechanism 40 is supported by frame 38 through its attachment to a rigid support bar 42 which remains fixed. Together with a corresponding mechanism on the other side of body housing 12, pivot mechanism 40 defines a tilt axis 45 for body housing 12, tilt axis 45 being collinear with the center of pivot mechanism 40.

Figure 1A:
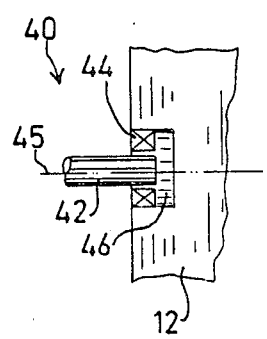
FIGS. 1a-b are partial views taken along line I—I of FIG. 1 illustrating two possible mounting arrangements of the improved viewfinder of FIG. 1.
Figure 1B:
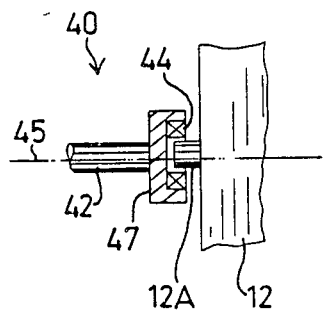

As will occur to those skilled in the art, pivot mechanism 40 may be implemented in several ways, of which two possibilities are shown in FIGS. 1a-b. In FIG. 1a, a bearing 44 is mounted in an opening 46 of body housing 12 to permit rotation about support bar 42. Alternatively, as shown in FIG. 1b, support bar 42 may be rigidly fastened to a fixed wheel 47 having bearing 44 mounted therein for supporting a portion 12a of body housing 12 in rotatable fashion. Still another arrangement could have fixed wheel 47 as part of support frame 38, thereby eliminating support bar 42. Equivalent arrangements may be employed for pivot mechanism 40, as long as body housing 12 is rotatable about tilt axis 45 with respect to fixed external support frame 38.

A planetary transmission (not shown in FIG. 1) is located generally within a space enclosed by cover plate 34 and is operatively associated with pivot mechanism 40 and head mirror 26. As further described herein, operation of viewfinder 10 is such that a change in the tilt angle of the body housing 12 about tilt axis 45 will simultaneously cause rotation of head mirror 26 about axis 29 in relation to the synchronized motion of the planetary transmission, thereby adjusting the elevation angle of the line of sight 18. As will be seen, design of the planetary transmission in accordance with the invention allows greater variation in the adjustment of the elevation angle of the line of sight 18 than is available in prior art systems.

Figure 2:
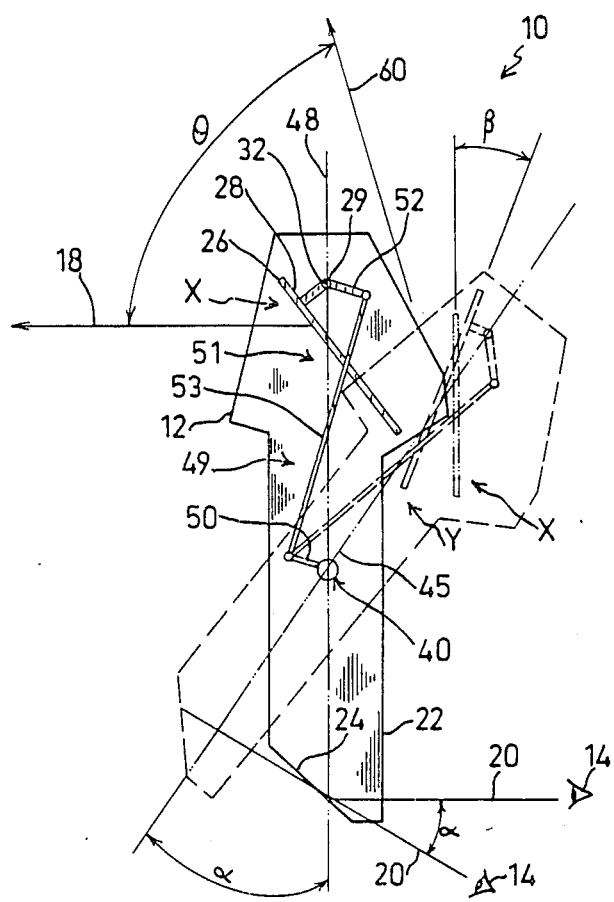
FIG. 2 is a side view taken along lines II—II of FIG. 1 showing a linked arm embodiment of the planetary transmission and the operation thereof in adjusting the elevation angle of the line of sight.

Referring now to FIG. 2, there is shown a side view of the viewfinder of FIG. 1 taken in the direction of the arrows II—II. The cover plate 34 has been removed for this illustration, and body housing 12 is shown as having the initial orientation as per FIG. 1, which is represented in solid lines. The dotted line represents the orientation of body housing 12 after being tilted clockwise around tilt axis 45. For purposes of the following discussion, the initial position is defined in terms of the vertical line 48 passing through axis 29 and tilt axis 45. This convention is also followed for FIGS. 3 and 4.

In the embodiment of FIG. 2, there is shown generally a planetary transmission 49 comprising a linked arm arrangement comprising a fixed arm 50, a bent arm 52, and a long arm 53 which are made of a rigid material for mechanical applications. A fourth arm is provided as a rigid arm 51 by the portion of body housing 12 disposed along vertical line 48 between axes 29 and 45.

The construction of the linked arm arrangement of planetary transmission 49 is such that fixed arm 50 has one end rigidly connected to pivot mechanism 40. This connection is made such that free end of fixed arm 50 is fixed in position with respect to support frame 38. An obtuse angle is formed in bent arm 52 which is mounted on shaft 32. Bent arm 52 has two free ends, one of which is fixedly attached to mirror 26, the other being joined in pivoting fashion to one end of long arm 53. The other end of long arm 53 is joined in pivoting fashion to the free end of fixed arm 50. Thus, long arm 53 and rigid arm 51 are crossed one over the other in the construction of planetary transmission 49.

In accordance with the principles of the invention, adjustment to the viewer's line of sight 20 is made by adjusting the elevation angle of the line of sight 18 to the landscape 16, this by tilting of the body housing 12 and rotation of head mirror 26 therein. Planetary transmission 49 is operative to transfer tilting motion of body housing 12 as rotational motion of head mirror 26 to thereby achieve the desired adjustment.

In the initial orientation of body housing 12, head mirror 26 is shown as having an orientation X. This provides the viewer 14 with line of sight 18 which falls within his line of sight 20 because of the optical periscope provided by the arrangement of mirror 24 and head mirror 26.

In operation, when body housing 12 is tilted clockwise by an angle α, planetary transmission 49 matches the sense of the tilt and changes the elevation angle of line of sight 18 to that of resultant angle θ to provide the adjusted line of sight 60. The adjustment to the viewer's line of sight 20 is also α and this is within the range of helmet and neck motion of the viewer 14. Whereas in the prior art tilt body periscope systems having a fixed head mirror, the tilt angle α and resultant angle θ would be equivalent, the present invention provides an adjusted line of sight 60 with increased elevation because resultant angle θ is greater than tilt angle α by virtue of the operation of planetary transmission 49.

As seen in the tilted position of body housing 12 indicated by the dotted lines, head mirror 26 has rotated in the clockwise direction from its orientation X to an orientation Y with respect to body housing 12. The difference in its orientation is denoted by the rotation angle β, and based on the law of reflection, it is possible to prove that the mathematical relationship for the resultant angle θ (expressed in terms of rotation angle β and tilt angle α) will be:

$$\theta = \alpha + 2\beta \qquad (1)$$

Where fixed arm 50 and bent arm 52 have equal lengths which are small in relation to long arm 53, clockwise rotation of body housing 12 by tilt angle α effectively rotates mirror 26 clockwise by an equal amount. This is caused by rotational motion of rigid arm 51 of body 12 which is inversely transferred via fixed arm 50 to long arm 53 and bent arm 52, and ultimately to mirror 26. For a given change in tilt angle α, rotation angle β of head mirror 26 adds to the elevation angle of the adjusted line of sight 60. Planetary transmission 49 is therefore considered to have an inverse transmission ratio of 1:1. Thus, rotation angle β of mirror 26 is equivalent to α, and equation (1) reduces to θ = 3α. This represents a 3:1 change in the elevation angle of the line of sight for a given body tilt angle α.

In accordance with this result, it can be seen that for limited neck motion of the viewer in the range of 30–40 degrees, the line of sight elevation angle can be adjusted as much as 90–120 degrees. In contrast to prior art systems having a movable head mirror in a fixed (non-tiltable) body housing, the improved viewfinder of the present invention is thus capable of achieving a 50% increase in the overall adjustment to the elevation angle of the line of sight. Neglecting manufacturing tolerances, the kinematic error introduced by linked arm planetary transmission 49 is small, within the range of 0.2 to 0.5 milliradians, when it is constructed so that ratio of the lengths of fixed arm 50 and bent arm 52 to long arm 53 is about 1:15 to 1:10.

Tilting of the body housing 12 can be accomplished directly by a pair of handles 72 mounted on body housing 12 or by an electrical or mechanical drive arrangement. For example, in a military application, the tilting of body housing 12 can be linked to the motion of an operational elevation system such as that used to aim artillery guns or radar antennas.

In accordance with the principles of the invention, it is also possible to further increase the elevation angle of the line of sight by use of a prism instead of a conventional reflecting type head mirror 26. The prism effect is useful here to increase the elevation angle of the line of sight.

Turning now to FIG. 3, there is shown an alternative embodiment of the planetary transmission 49 shown in FIG. 2. Here, planetary transmission 62 comprises an upper wheel 64 mounted on shaft 32 (not shown) together with head mirror 26 so as to be rotatable about axis 29. Pivot mechanism 40 is provided as illustrated in the arrangement of FIG. 1b such that fixed wheel 47 is non-movable with respect to support frame 38. A crossed-loop 68 such as a belt, chain or band is looped under tension between upper wheel 64 and fixed wheel 47.

As before, when body housing 12 is tilted clockwise about axis 45 by an angle α to the position indicated by the dotted lines, the elevation angle of the line of sight 18 is adjusted to that of resultant angle θ to provide the adjusted line of sight 60. In this embodiment, planetary transmission 62 matches the sense of tilt angle α because as it rotates around fixed wheel 47, belt 68 imparts a rotation to upper wheel 64 as given by the ratio of the respectively diameters D1 and D2 of wheels 47 and 64. Thus, rotation angle β of head mirror 26 is given by:

$$\beta = \alpha * D1/D2 \qquad (2)$$

As shown in FIG. 3, the sense of head mirror 26 rotation is clockwise like that of the tilt because belt 68 is crossed over itself and therefore reverses the rotation of head mirror 26 otherwise obtained if the belt 68 were simply a direct loop around wheels 47 and 64. Thus, planetary transmission 62 provides an inverse transmission ratio which is based on the ratio D1/D2 defined above. The expression for the resultant elevation angle θ corresponding to tilt angle α is given by equation (1).

For an appropriate choice of the ratio D1/D2, the adjustment to the elevation angle of the line of sight 60 for a given tilt angle α can be determined in accordance with the application of viewfinder 10. For example, if the ratio of D1/D2 is chosen to give a 1:1 transmission ratio, a given clockwise tilt angle α will produce an identical clockwise rotation angle β in head mirror 26 such that the overall adjustment to the elevation angle of the line of sight 60 will be given by θ = 3α, as in the embodiment of FIG. 2.

In another alternative embodiment, the planetary transmission can be constructed by providing fixed wheel 47 as a pie-shaped toothed wheel portions which is enmeshed with a similar toothed wheel portion mounted on shaft 32. As before, the sense of rotation of head mirror 26 will be matched to the tilt direction of body housing 12.

FIG. 4 shows a further alternative embodiment of the planetary transmission 62 used in FIGS. 2–3. This embodiment is similar to that shown and described in FIG. 3, with two important differences, namely, that a belt 70 comprises a direct belt drive and the ratio of the diameters of wheels 47 and 64 (D/2 and D) is designed to provide a 1:2 transmission ratio. Use of a direct belt drive acts to cause rotation angle β of head mirror 26 to be in the opposite sense from that of tilt angle α such that for a clockwise tilt of body housing 12, a counterclockwise rotation about axis 29 is produced in head mirror 26.

In this design, the opposite sense of head mirror 26 rotation together with the 1:2 transmission ratio of wheels 47 and 64 has the effect of halving tilt angle α in producing rotation angle β of mirror 26, thus:

$$\beta = -\alpha/2 \qquad (3)$$

Applied to equation (1), this leads to the conclusion that the resultant angle θ will be zero, that is, there will be no change in the elevation angle of line of sight 18 for a given tilt angle α. This result is particularly useful in certain applications where stabilization of line of sight 18 is desired.

In the embodiments of FIGS. 2-4, viewer 14 must adjust his relative position, for example by motion of his neck, in order to maintain the line of sight 20 once body housing 12 has been tilted. The principle of stabilization of the line of sight 18 described with reference to FIG. 4 is applicable to line of sight 20 to eliminate the need for this viewer adjustment. If mirror 24 is mounted on an appropriate rotation axis, a direct belt drive can be constructed between fixed wheel 47 and the rotation axis of mirror 24 so that for a given tilt of body housing 12, line of sight 20 is stabilized and viewer 14 need not adjust his relative position.

Thus, in accordance with the present invention there is provided an improved viewfinder capable of adjusting the elevation angle of the line of sight with greater variation than that obtainable in prior art systems. This is accomplished by combined motion of the viewfinder housing and the head mirror therein, in accordance with the synchronization of motion afforded by a planetary transmission.

While the principles of the invention have been described with regard to specific embodiments, it is to be understood that the description is made by way of example only and not as a limitation on the scope of the invention, which is set forth in the appended claims.

We claim:

1. An improved viewfinder for viewing a landscape along a selected line of sight, said viewfinder comprising:
    a window periscope comprising a body housing, reflective means mounted on a rotation axis within an end portion of said body housing and being operable to adjust the elevation angle of the line of sight, and optical means fixedly mounted in another end portion of said housing for relaying the line of sight to a viewer in relation to said adjustment;
    means for supporting said body housing and defining a tilt axis about which said body housing may be selectably rotated; and
    a transmission means operatively associated with said supporting means and said reflective means for rotating said reflective means in response to tilting of said body housing about said tilt axis and thereby providing said elevation angle adjustment in relation to said rotation.

2. The viewfinder of claim 1 wherein said reflective means is a head mirror mounted in an upper end portion of said body housing.

3. The viewfinder of claim 1 wherein said reflective means is a prism mounted in an upper end portion of said body housing.

4. The viewfinder of claim 1 wherein said supporting means comprises a support frame and a pivot mechanism having fixed and rotatable portions, said fixed portion being a wheel fixedly attached to said support frame and said rotatable portion being integral with said body housing and defining said tilt axis, said tilting operation providing said body housing with a tilt angle about said fixed portion, said transmission means providing said elevation angle adjustment in relation to said tilt angle.

5. The viewfinder of claim 2 wherein said supporting means comprises a support frame and a pivot mechanism having fixed and rotatable portions, said fixed portion being a wheel fixedly attached to said support frame and said rotatable portion being integral with said body housing and defining said tilt axis, said tilting operation providing said body housing with a tilt angle about said fixed portion, said transmission means providing said elevation angle adjustment in relation to said tilt angle.

6. The viewfinder of claim 3 wherein said supporting means comprises a support frame and a pivot mechanism having fixed and rotatable portions, said fixed portion being a wheel fixedly attached to said support frame and said rotatable portion being integral with said body housing and defining said tilt axis, said tilting operation providing said body housing with a tilt angle about said fixed portion, said transmission means providing said elevation angle adjustment in relation to said tilt angle.

7. The viewfinder of claim 4 wherein said transmission means is provided as a planetary transmission having an inverse transmission ratio of 1:1 between the direction of said body housing tilt angle and the corresponding direction of said head mirror rotation.

8. The viewfinder of claim 7 wherein said planetary transmission is provided as a linked arm arrangement of four arms comprising:
    a rigid arm formed by the portion of said body housing between said pivot mechanism and said rotation axis;
    a relatively short fixed arm rigidly attached to the fixed portion of said pivot mechanism;
    a relatively short bent arm affixed at one end to said head mirror and mounted so as to pivot on said rotation axis; and
    a relatively long arm pivotally engaged at its upper end to the other end of said bent arm, said long arm crossing over said rigid arm and being pivotally engaged at its lower end with a free end of said fixed arm.
    translation of said long arm in accordance with the direction of said body housing tilt angle being transferred as pivoting motion of said bent arm for providing said head mirror rotation in the same direction, thereby adjusting said line of sight elevation angle.

9. The viewfinder of claim 7 wherein the planetary transmission comprises:
    a wheel mounted for rotation about said head mirror rotation axis together with said head mirror;
    a cross-belt looped about said pivot mechanism and said wheel so as to transfer said body housing tilt angle direction as rotation of said head mirror in the same direction, thereby adjusting said line of sight elevation angle.

10. The viewfinder of claim 4 wherein said transmission means is provided as a planetary transmission comprising a generally circular belt looped around the fixed wheel of said pivot mechanism and a rotatable wheel mounted on said head mirror rotation axis, said rotatable wheel being twice the diameter of said fixed wheel so as to provide a 1:2 transmission ratio for halving said body housing tilt angle in one direction in producing rotation of said head mirror in the opposite direction, thereby stabilizing said line of sight elevation angle.

11. The viewfinder of claim 1 wherein said tilting operation is provided by electrical drive means operatively associated with said body housing.

12. The viewfinder of claim 1 wherein said tilting operation is provided by mechanical drive means operatively associated with said body housing.

13. In a viewfinder including a window periscope comprising reflective means mounted on a rotation axis within an end portion of the periscope for adjusting the elevation angle of the line of sight to a landscape and relaying it to a viewer, a method of adjusting the elevation angle comprising the steps of:
   supporting and periscope and defining a tilt axis about which it can rotate;
   tilting the viewfinder by a tilt angle about said tilt axis in a first direction; and
   transmitting said tilt angle as rotational motion of the reflective means for adjusting the elevation angle in relation to said first direction.

14. The method of claim 13 wherein said transmitting step is performed by a planetary transmission having a predetermined transmission ratio which rotates the reflective means opposite to said first direction in an amount equal to half of said tilt angle.

15. An improved viewfinder for viewing a landscape along a line of sight, said viewfinder comprising:
   a window periscope comprising a body housing, reflective means mounted on a rotation axis within an end portion of said body housing and being operable to adjust the elevation angle of the line of sight, and optical means fixedly mounted in another end portion of said housing for relaying the line of sight to a viewer in relation to said adjustment;
   means for supporting said body housing comprising a support frame and a pivot mechanism having fixed and rotatable portions, said fixed portion being a wheel fixedly attached to said support frame and said rotatable portion being integral with said body housing and defining a tilt axis about which said body housing can rotate in a tilting operation, said tilting operation providing said body housing with a tilt angle about said fixed portion; and
   a planetary transmission operatively associated with said supporting means and said reflective means for providing said elevation angle adjustment in relation to said tilt angle of said tilting operation, and having an inverse transmission ratio of 1:1 between the direction of said body housing tilt angle and the corresponding direction of said head mirror rotation, said planetary transmission being provided as a linked arm arrangement of four arms comprising:
   a rigid arm formed by the portion of said body housing between said pivot mechanism and said rotation axis;
   a relatively short fixed arm rigidly attached to the fixed portion of said pivot mechanism;
   a relatively short bent arm affixed to one end to said head mirror and mounted so as to pivot on said rotation axis;
   a relatively long arm pivotally engaged at its upper end to the other end of said bent arm, said long arm crossing over said rigid arm and being pivotally engaged at its lower end with a free end of said fixed arm; and
   translation of said long arm in accordance with the direction of said body tilt angle being transferred as pivoting motion of said bent arm for providing said head mirror rotation in the same direction, the ratio of said line of sight elevation angle adjustment to said body housing tilt angle being approximately 3:1.

16. An improved viewfinder for viewing a landscape along a line of sight, said viewfinder comprising:
   a window periscope comprising a body housing, reflective means mounted on a rotation axis within an end portion of said body housing and being operable to adjust the elevation angle of the line of sight, and optical means fixedly mounted in another end portion of said housing for relaying the line of sight to a viewer in relation to said adjustment;
   means for supporting said body housing comprising a support frame and a pivot mechanism having fixed and rotatable portions, said fixed portion being a wheel fixedly attached to said support frame and said rotatable portion being integral with said body housing and defining a tilt axis about which said body housing can rotate in a tilting direction, said tilting operation providing said body housing with a tilt angle about said fixed portion; and
   a planetary transmission operatively associated with said supporting means and said reflective means for providing said elevation angle adjustment in relation to said tilt angle of said tilting operation, and having an inverse transmission ratio of 1:1 between the direction of said body housing tilt angle and the corresponding direction of said head mirror rotation, said planetary transmission comprising a cross-belt looped around said pivot mechanism and a wheel mounted on said head mirror rotation axis so as to transfer said body housing tilt angle direction as rotation of said head mirror in the same direction, thereby adjusting said line of sight elevation angle, the ratio of said line of sight elevation angle adjustment to said body housing tilt angle being approximately 3:1.

17. An improved viewfinder for viewing a landscape along a line of sight, said viewfinder comprising:
   a window periscope comprising a body housing, reflective means mounted on a rotation axis within an end portion of said body housing and being operable to adjust the elevation angle of the line of sight, and optical means fixedly mounted in another end portion of said housing for relaying the line of sight to a viewer in relation to said adjustment;
   means for supporting said body housing and defining a tilt axis about which said body housing can rotate in a tilting operation;
   a pair of handles affixed to said body housing for enabling a viewer to provide said tilting operation; and
   a transmission means operatively associated with said supporting means and said reflective means for providing said elevation angle adjustment in relation to said tilt angle of said tilting operation.

18. In a viewfinder including a window periscope comprising reflective means mounted on a rotation axis within an end portion of the periscope for adjusting the elevation angle of the line of sight to a landscape and relaying it to a viewer, a method of adjusting the elevation angle comprising the steps of:
   supporting said periscope and defining a tilt axis about which it can rotate;
   tilting the viewfinder by a tilt angle about said tilt axis in a first direction; and
   transmitting by means of a planetary transmission said tilt angle as rotational motion of the reflective means for adjusting the elevation angle in relation to said first direction in an amount related approximately by a 3:1 ratio to said tilt angle.

* * * * *

UNITED STATES PATENT AND TRADEMARK OFFICE
CERTIFICATE OF CORRECTION

PATENT NO. : 4,859,045

DATED : August 22, 1989

INVENTOR(S) : Jacob DAGAN et al.

It is certified that error appears in the above-identified patent and that said Letters Patent is hereby corrected as shown below:

Claim 13, column 9, line 7, change first occurrence of "and" to --said--.

Signed and Sealed this

Fifteenth Day of January, 1991

Attest:

HARRY F. MANBECK, JR.

Attesting Officer

Commissioner of Patents and Trademarks